United States Patent
Ryan et al.

(10) Patent No.: US 7,697,502 B2
(45) Date of Patent: *Apr. 13, 2010

(54) COMMUNICATION MULTISTAGE SWITCHING TECHNIQUES

(75) Inventors: Thomas E. Ryan, Batavia, IL (US); Terrence J. Tanis, Alsip, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1178 days.

This patent is subject to a terminal disclaimer.

(21) Appl. No.: 11/283,643

(22) Filed: Nov. 21, 2005

(65) Prior Publication Data

US 2006/0072560 A1    Apr. 6, 2006

Related U.S. Application Data

(63) Continuation of application No. 09/943,980, filed on Aug. 31, 2001, now Pat. No. 7,027,436.

(51) Int. Cl.
*H04L 12/28* (2006.01)
(52) U.S. Cl. ........................ 370/351; 370/467
(58) Field of Classification Search ........................ None
See application file for complete search history.

(56) References Cited

U.S. PATENT DOCUMENTS

| | | | |
|---|---|---|---|
| 5,144,297 A | 9/1992 | Ohara | |
| 5,579,310 A | 11/1996 | Heiles et al. | |
| 5,675,580 A | 10/1997 | Lyon et al. | |
| 6,205,562 B1 * | 3/2001 | Fukushima et al. | 714/43 |
| 6,587,470 B1 * | 7/2003 | Elliot et al. | 370/404 |
| 6,600,741 B1 * | 7/2003 | Chrin et al. | 370/375 |
| 6,628,651 B1 | 9/2003 | Ryan et al. | |
| 6,636,511 B1 * | 10/2003 | Roy et al. | 370/390 |
| 6,671,271 B1 * | 12/2003 | Takemura et al. | 370/352 |
| 6,754,208 B2 | 6/2004 | Kam et al. | |
| 6,870,877 B2 * | 3/2005 | Notani | 375/221 |
| 6,996,095 B2 * | 2/2006 | McNeil et al. | 370/358 |
| 7,027,436 B2 * | 4/2006 | Ryan et al. | 370/367 |
| 2001/0033569 A1 | 10/2001 | Dally | |
| 2001/0053146 A1 * | 12/2001 | Lyon et al. | 370/359 |
| 2002/0196792 A1 * | 12/2002 | McNeil et al. | 370/401 |
| 2003/0012188 A1 | 1/2003 | Zelig et al. | |
| 2005/0068988 A1 * | 3/2005 | Jarabek et al. | 370/506 |
| 2007/0211763 A1 * | 9/2007 | Solomon et al. | 370/498 |

* cited by examiner

*Primary Examiner*—Chi H Pham
*Assistant Examiner*—Fan Ng
(74) *Attorney, Agent, or Firm*—Hamilton, Brook, Smith & Reynolds, P.C.

(57) ABSTRACT

Multistage switching for mixed SONET VT traffic, such as VT1.5s and VT2s, is accomplished by employing an input time switch, a space switch and an output time switch. The input time switch and output time switch include VT1.5 time switches arranged to alter the time order of the input VT1.5s and VT2 time switches arranged to alter the time order to the input VT2s. The space switch includes a VT1.5 space switch arranged to order the input VT1.5s with respect to output channels in an output channel order different from the input channel order of the VT1.5s. The space switch also includes a VT2 space switch arranged to order the input VT2s with respect to output channels in an output channel order different from the input channel order of the VT2s.

25 Claims, 8 Drawing Sheets

Time Switching Mixed VT Traffic: VT1.5 Time Switch Step

IN THIS EXAMPLE, VT GROUPS 3, 5, AND 7 CARRY VT1.5S WHILE VT GROUPS 1, 2, 4 AND 6 CONTAIN VT2S.

THE DARK COLUMNS REPRESENT NON-VT1.5 TRAFFIC WHICH IS IGNORED BY THE VT1.5 SWITCHING ELEMENTS.

ALL WHITE COLUMNS CAN BE INTERCHANGED WITH EACH OTHER FOR FULL TIME MANIPULATION OF THE VT1.5 TRAFFIC CONTENT.

VT GROUPS 1, 2, 4

Fig. 6

Time Switching Mixed VT Traffic: VT2 Time Switch Step

CONTINUING WITH THE SAME EXAMPLE AS IN FIGURE 5, VT GROUPS 3, 5, AND 7 CARRY VT1.5S WHILE VT GROUPS 1, 2, 4 AND 6 CONTAIN VT2S.

THE DARK COLUMNS REPRESENT NON-VT2 TRAFFIC WHICH IS IGNORED BY THE VT2 SWITCHING ELEMENTS.

ALL WHITE COLUMNS CAN BE INTERCHANGED WITH EACH OTHER FOR FULL TIME MANIPULATION OF THE VT2 TRAFFIC CONTENT.

VT GROUPS 3, 5 AND 7 CAN BE EXCHANG

Fig. 7

COMMUNICATION MULTISTAGE SWITCHING TECHNIQUES

CROSS-REFERENCE TO RELATED APPLICATIONS

The present application is a continuation of U.S. patent application Ser. No. 09/943,980, filed Aug. 31, 2001 now U.S. Pat. No. 7,027,436.

BACKGROUND OF THE INVENTION

This invention relates to communication data switching and more particularly relates to such switching of data organized in frames which accommodate groups of data of different sizes.

In the field of telecommunications, there are a number of standard frame formats which are built from successive combinations of fundamental 64 KBit/sec. channels. Each channel is represented as 8 bits transmitted every 125 microseconds (uS) (also referred to as a DS0 channel or an E0 channel). One such format is SONET (Synchronous Optical Network) which creates 125 uS frames containing Virtual Tributaries (VTs). The size of the VTs depends on the underlying payload being transported within a SONET frame. VT sizes include VT1.5, VT2, VT3 and VT6.

Of particular interest are the VT1.5 and VT2. The VT1.5 contains a total of 27 bytes of 8 bits per 125 uS frame and was sized to accommodate a DS1 payload. A DS1 is a standard format comprised of 193 bits per 125 uS frame—192 bits representing twenty-four DS0s and 1 overhead bit. Twenty-eight VT1.5s can be placed within a SONET STS-1 Synchronous Payload Envelope (SPE), the payload part of a SONET STS-1 transport frame. The VT2 contains a total of 36 bytes of 8 bits per 125 uS frame and was sized to accommodate an E1 payload. An E1 has 256 bits per 125 uS frame—240 bits representing thirty E0s and 16 overhead bits. Twenty-one VT2s can fit in an SONET STS-1 SPE. The STS-1 SPE is segmented into 7 VT Groups. Each VT Group can contain 4 VT1.5s or 3 VT2s.

Manipulation of traffic contained within a SONET STS-n SPE requires the ability to interchange VTs from one SONET stream to another. Switch fabrics exist which are optimized based on the level of hierarchy they need to operate. To be a totally non-blocking VT-level switch, it must be true that any incoming VT position in a SONET frame can be mapped to any same-sized free VT position in an outgoing SONET frame. This requires both time and space manipulation by the switch fabric. Typical switch network architectures to perform these functions are known to be realized by cascading time and space switch elements. One known example of this type of architecture is the T-S-T architecture, where the signals pass through a total of three network stages, the first and last of which are time switched, and the middle of which is space switched. Furthermore, a different type of switch architecture using a three stage space switching network could be used to give a T-S-S-S-T type configuration.

Figure 1:
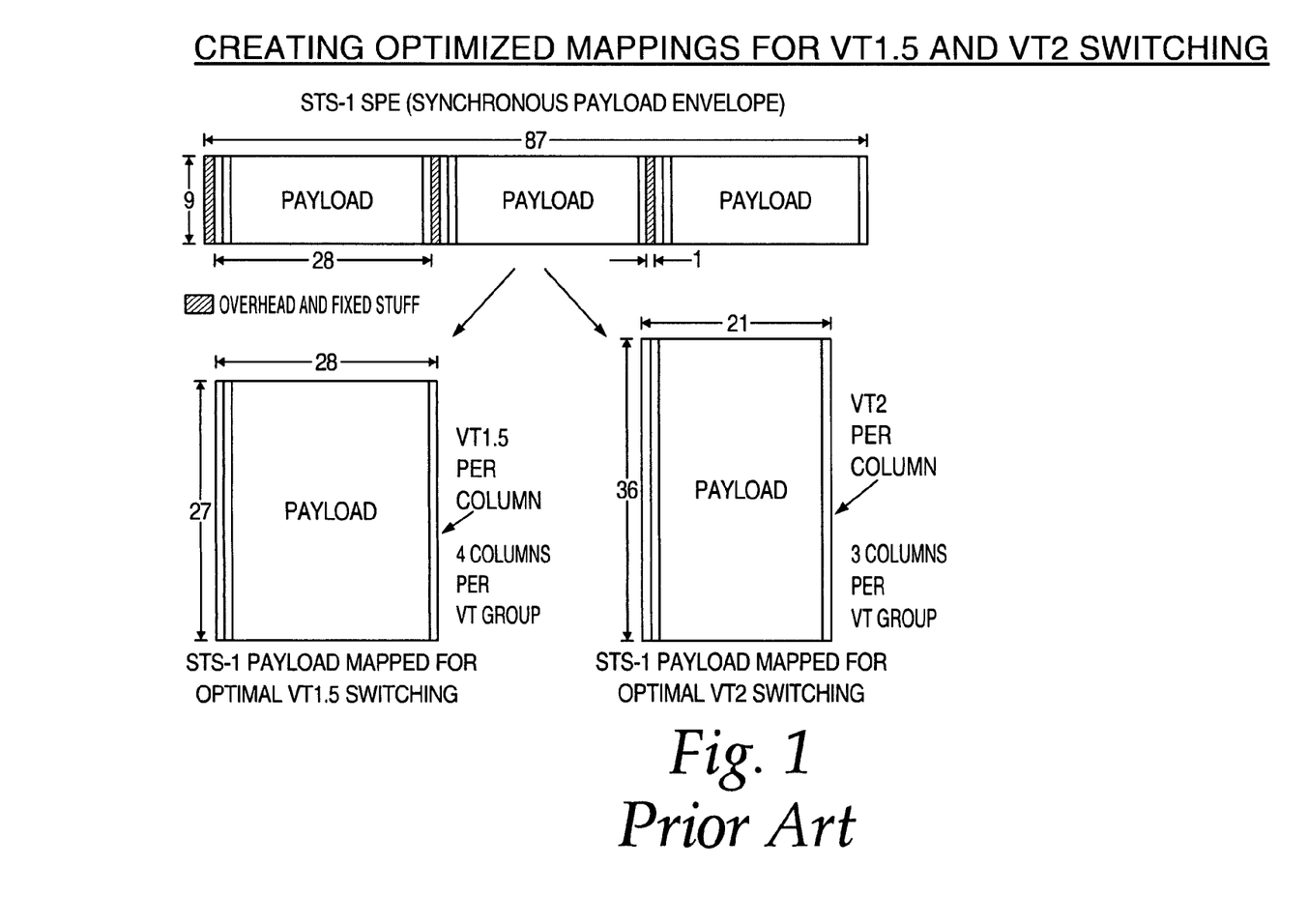
FIG. 1 is a diagram illustrating prior art mappings for VT1.5 and VT2 switching.

FIG. 1 illustrates how the payload of an STS-1 can be reconfigured for optimal switching of VT1.5s or VT2s. The STS-1 SPE overhead and fixed stuff columns are discarded as they are not needed for VT-level mappings and cross-connection. These mappings typically assume that the entire payload is composed of VT sizes that are either all multiples of VT1.5 or all multiples of VT2. In both configurations, the number of columns is minimized to provide the desired level of switching with minimal memory and time switch delay.

Time switching involves re-ordering the time sequence (or VT position) of the VTs within a single SONET frame. This typically is realized by buffering the input stream such that as each output byte is required, a stable sample of the previous byte from any input timeslot (or VT position) is guaranteed to be available. In the case of a VT1.5 time switch for instance, 28 bytes of storage are required. For a VT2 time switch, 21 bytes of storage are required. A significant delay in the data path results from this input buffering with the delay being a function of the resolution required of the switch fabric (the lower the resolution, the longer the delay). Lower resolution also increases memory size and power dissipation.

Space switching is equivalent to a crossbar function where a given output's content can be based on one of several inputs. To achieve VT level switching, the selection of the input must be dynamic such that each VT timeslot in the SONET frame can have a unique mapping. Essentially no data delay is incurred in space switching. Resolution level in a space switching element does impact memory size and power dissipation, though not to the same degree experienced by the time switch stage.

Figure 2:
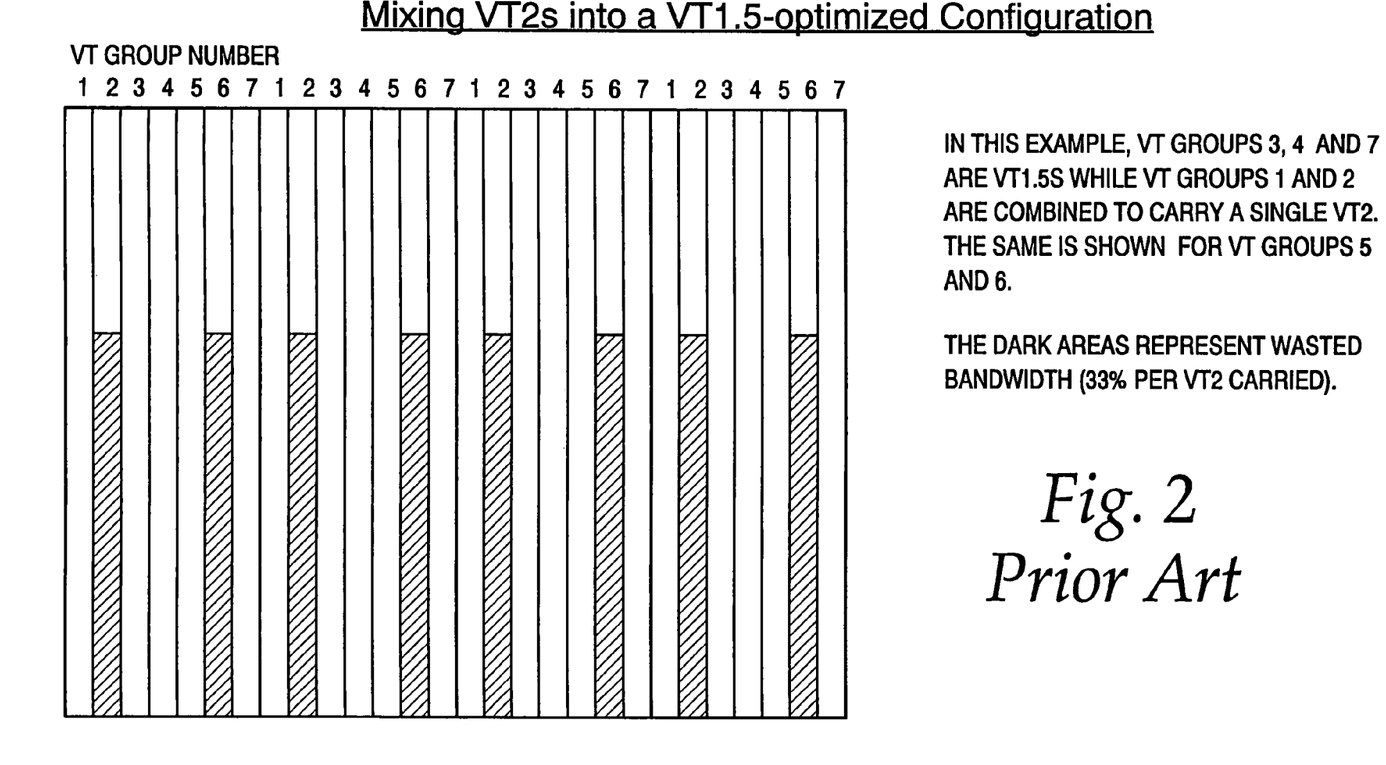
FIG. 2 is a diagram illustrating prior art mappings for mixing VT2s into a VT1.5-optimized configuration.
Figure 3:
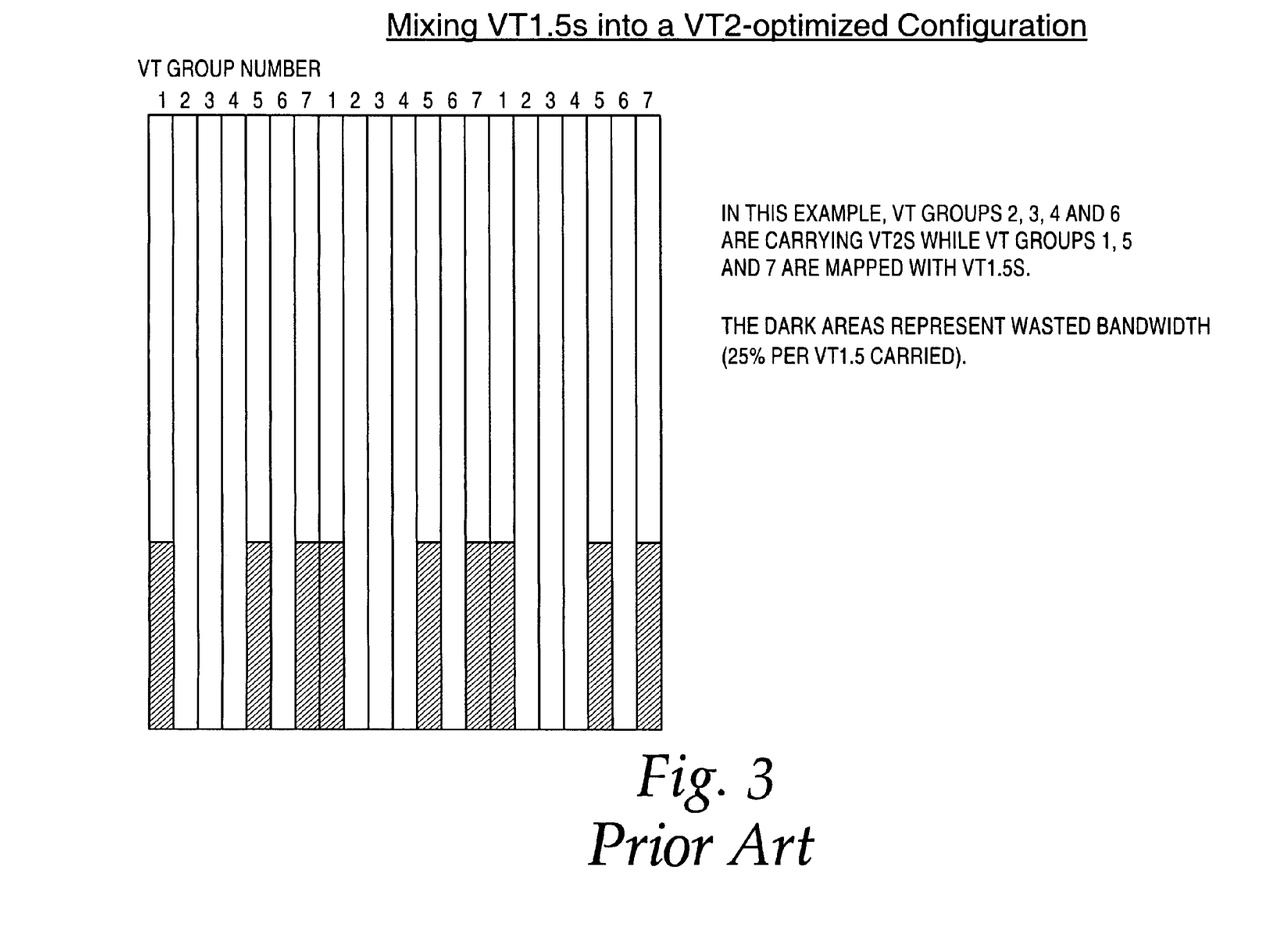
FIG. 3 is a diagram illustrating prior art mappings for mixing VT1.5s into a VT2-optimized configuration.

For both time and space switching, the resolution of the fabric is typically consistent, and generally is set up to handle either VT1.5 or VT2 signals. However, the STS-1 frames could contain some VT Groups carrying VT1.5s and some containing VT2s. This presents a challenge, because systems optimized for manipulating VT1.5s cannot handle VT2s efficiently. Such a system would either need to have the VT2 distributed over 2 VT1.5s, which would then be mapped together through the fabric (resulting in a 33% loss of bandwidth efficiency as shown in FIG. 2), or it would be necessary to switch VT Groups with VT2s at the VT Group level (with a loss in routing flexibility, as all 3 VT2s would need to stay in that VT Group as it passes through the fabric). The reverse is also true. A system optimized for VT2 switching will not be able to accommodate VT1.5 manipulation without first mapping the VT1.5s into VT2s (resulting in a 25% bandwidth efficiency loss as shown in FIG. 3) or again resorting to switching the VT Group containing VT1.5s intact through the fabric.

A common method of handling "mixed traffic" composed of VT1.5s and VT2s is to employ a DS0/E0 level switch. The fabric can manipulate VT1.5s and VT2s without any lost bandwidth efficiency. The disadvantage lies in the large increase in data delay (~125 uS per time switch stage) and memory for storing connections and data. This is due to the need to store a full 125 uS frame of data in the time switch as opposed to only one byte per VT1.5 or VT2. These issues either eliminate this approach (data delay beyond network requirements) or reduce density (large memories restrict the capacity of individual switch elements).

Other fabrics have been proposed which operate on a 100 column basis, capable of manipulating VT traffic of any size by concatenating ~0.5 Mbps payload containers to form the various VT sizes. For example, see U.S. Pat. No. 5,579,310 (Heiles et al., issued Nov. 26, 1996). This frame structure, however, cannot directly support multi-rate timeslot interchange capability due to the fact that 100 is not evenly divisible by both 3 and 4 (i.e., has a least common multiple of 12). For this reason, all timeslot interchange stages in this approach have to buffer all 100 columns (timeslots), thereby causing a maximum throughput delay, regardless of whether only one type of VT traffic is being switched or not.

Another approach is described in U.S. Pat. No. 5,144,297 (Ohara, issued Sep. 1, 1992) which describes the processing of data in 36 byte increments (FIGS. 5-10). Such an approach is inefficient because four STS-1 frames need to be stored before all 36 bytes of the processing increment are available. Furthermore, since overhead is added to each of the 36 byte increments, the ratio of overhead to usable payload data is less efficient, and the processing required to manipulate the overhead is significantly more involved than structures proposed herein, where the overhead is shared among several VTs equivalents interleaved to form an STS-1 SPE equivalent structure.

BRIEF SUMMARY OF THE INVENTION

The preferred embodiment is useful for switching data in a device comprising a plurality of input channels and a plurality of output channels. The data typically comprises a plurality of first groups of data transmitted in a predetermined first time order and arranged with respect to the input channels in a predetermined first input channel order. The data typically also comprises a plurality of second groups of data transmitted in a predetermined second time order and arranged with respect to the input channels in a predetermined second input channel order. The first groups comprise less data than the second groups. In such an environment, the predetermined first time order of the first groups of data is altered into a predetermined third time order different from the first time order. The altering resulting in the third time order preferably is done by a first switch. The predetermined second time order of the second groups of data is altered into a predetermined fourth time order different from the second time order. The altering resulting in the fourth time order preferably is done by a second switch. The first groups of data are ordered with respect to the output channels in an output channel order different from the first input channel order. The ordering of the first groups of data preferably is done with a third switch. The second groups of data are ordered with respect to the output channels in an output channel order different from the second input channel order. This ordering of the second groups of data preferably is done with a fourth switch.

By using the foregoing techniques, data organized into groups of different sizes, such as VT 1.5 and VT 2, may be switched with no loss of bandwidth or no reliance on DS0 switching.

DESCRIPTION OF THE PREFERRED EMBODIMENTS

Figure 4:
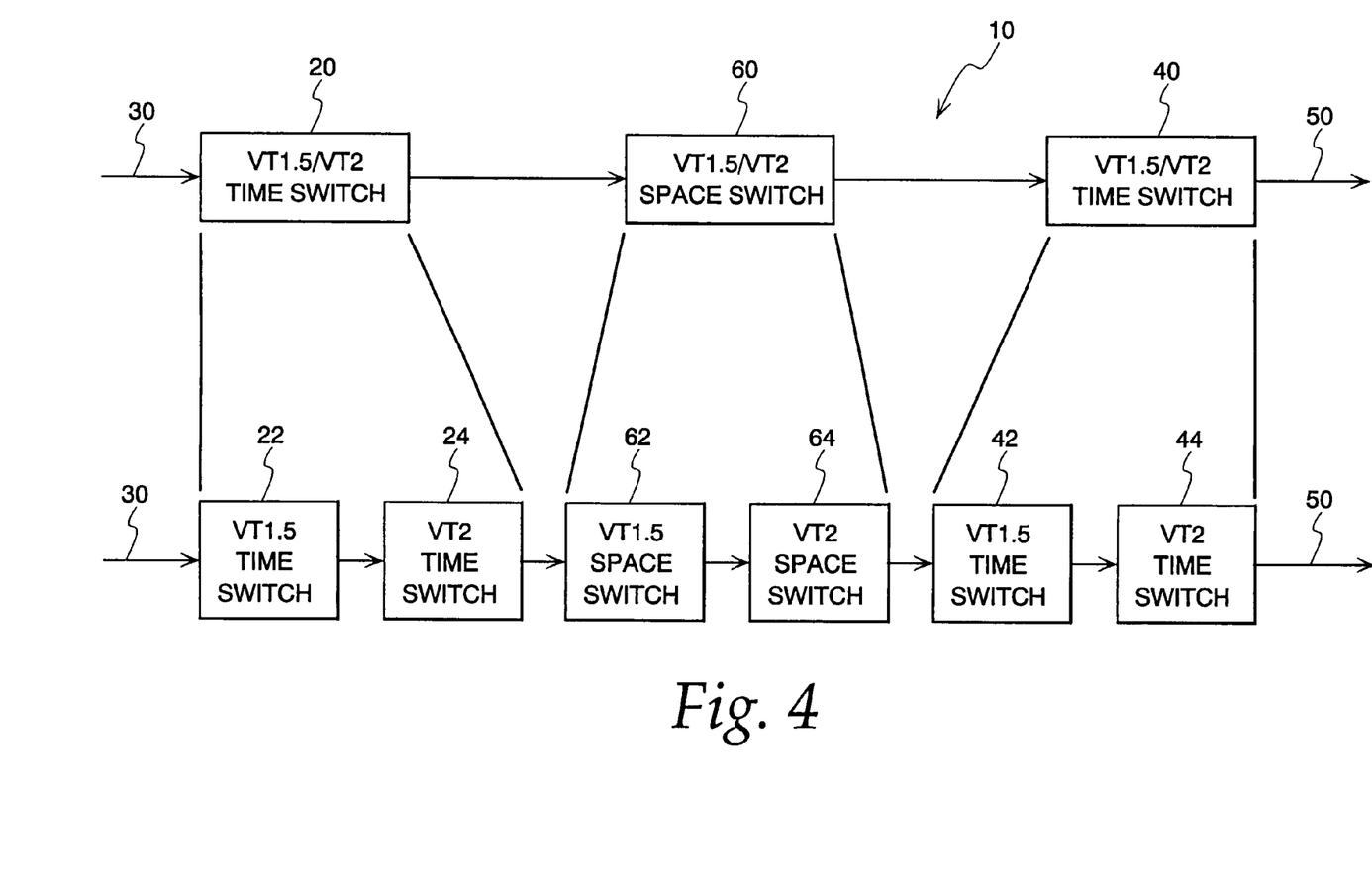
FIG. 4 is a schematic block diagram illustrating switches connected according a preferred form of the invention.

A system diagram of a preferred embodiment of the invention is shown in FIG. 4. The preferred embodiment comprises a switch unit 10 which includes three primary elements:

(1) an input time switch 20 which includes a plurality of input side interfaces (not shown) which receive input signals on multiple communication channels collectively shown as channel 30. The input communication channels may receive input facility signals organized according to standards such as DS1, E1, DS3, STS-1E, OC-3, and OC-12 in the inbound direction. The frames in the input signals include groups of data of different sizes, such as VT1.5 and VT2.

(2) an output time switch 40 which includes a plurality of output side interfaces (not shown) which interface the facility signals DS1, E1, DS3, STS-1E, OC-3, and OC-12 in the outbound direction on multiple output communication channels collectively shown as channel 50. The frames of the output signals include groups of data of different sizes, such as VT1.5 and VT2.

(3) a space switch 60 arranged in a particular configuration, so as to support completely non-blocking operation, whereby each input signal of a given size is guaranteed to be able to connect to any free output of the same size.

A control and processing subsection (not shown) performs all control, processing and communication of instructions to the plurality of input side interfaces, plurality of output side interfaces and switches 20, 40 and 60. The control and processing subsection also includes a user interface, whereby user commands are entered and processed.

Still referring to FIG. 4, time switch 20 comprises a time switch 22 arranged to alter the time order of VT1.5s and a time switch 24 arranged to alter the time order of VT2s. Space switch 60 comprises a space switch 62 arranged to order VT1.5s with respect to output channels 50 in an output channel order different from the input channel order 30 in which the VT1.5s are received. Space switch 60 also comprises a space switch 64 arranged to order VT2s with respect to output channels 50 in an output channel order different from the input channel order 30 in which the VT2s are received. Time switch 40 comprises a time switch 42 arranged to alter the time order of the VT1.5s ordered by time switch 22 into a different time order needed for communication over output channels 50. Time switch 40 also comprises a time switch 44 arranged to alter the time order of the VT2s ordered by time switch 24 into a different time order needed for communication output channels 50.

As shown in FIG. 4, traditional switch elements optimized for VT1.5 and VT2 are placed in series such that mixed traffic passing through both are exposed to switching opportunities at both levels. The ordering of the stages within the time and space functions is arbitrary. Thus, time switches 22 and 42 are traditional time switch elements optimized for VT 1.5 time switching; time switches 24 and 44 are traditional time switch elements optimized for VT2 time switching; space switch 62 is a traditional space switch element optimized for VT1.5 switching; and space switch 64 is a traditional space switch element optimized for VT2 switching.

Figure 5:
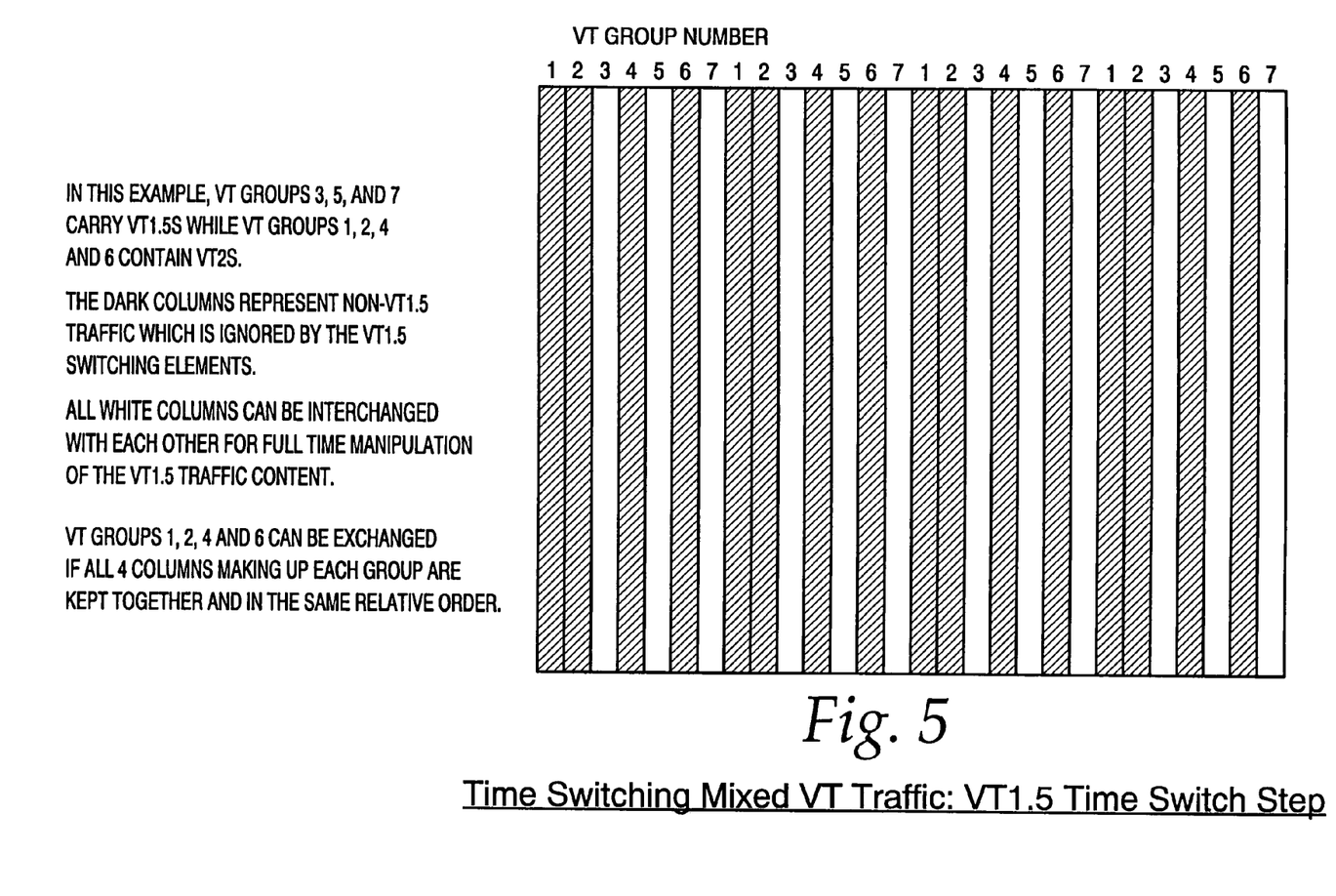
FIG. 5 is a diagram illustrating an exemplary form of VT1.5 time switching according to the invention.
Figure 6:
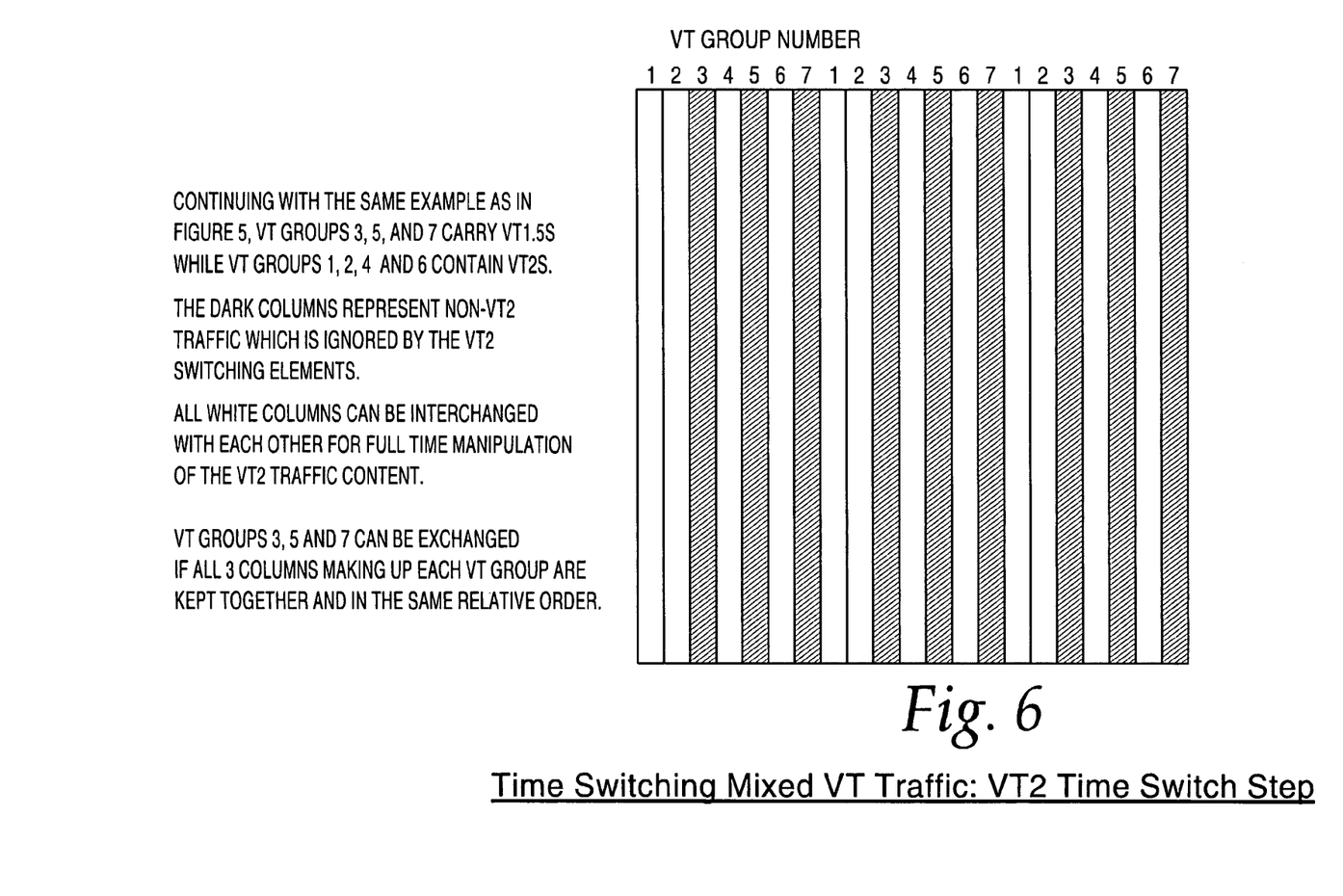
FIG. 6 is a diagram illustrating an exemplary form of VT2 time switching according to the invention.

Still referring to FIG. 4, a SONET frame containing VT Groups composed of VT1.5s and VT Groups composed of VT2s first enters the VT1.5 time switch element 22. Here all VT1.5s can be reordered with other VT1.5s within the SONET frame as shown in FIG. 5. Entire VT Groups containing VT2s can also be swapped with other VT Group positions within the frame. Exiting element 22, all the VT1.5s can be placed in their intermediate time manipulation with limitations. The VT2s are then reordered with each other in the second time switch element 24 as shown in FIG. 6. Further swapping of VT Groups containing VT1.5s with other VT Groups could occur, but this would not be required if properly managed in the first time stage 22. Exiting element 24, all VT2s can be placed in their intermediate time level with limitations.

standard as shown in Table 1. The time switches after the space switches function similarly and allow the space switch standard ordering to be remapped as desired.

TABLE 1

| STS SPE | Incoming VT Group Assignments (into switch stage 22) | Standard Space Switch Mapping (into space switch 62) | Outgoing VT Group Assignments (exiting final time switch stage 44) |
|---|---|---|---|
| 1 | VT2 VT1.5 VT1.5 VT2 VT2 VT2 VT1.5 | VT2 VT2 VT2 VT2 VT1.5 VT1.5 VT1.5 | VT2 VT1.5 VT1.5 VT2 VT2 VT2 VT1.5 |
| 2 | VT1.5 VT2 VT2 VT2 VT1.5 VT1.5 VT2 | VT2 VT2 VT2 VT2 VT1.5 VT1.5 VT1.5 | VT2 VT1.5 VT2 VT2 VT1.5 VT2 VT1.5 |
| ... | ... | ... | ... |
| N | VT1.5 VT1.5 VT2 VT1.5 VT2 VT2 VT2 | VT2 VT2 VT2 VT2 VT1.5 VT1.5 VT1.5 | VT1.5 VT1.5 VT2 VT2 VT1.5 VT2 VT2 |

Referring to FIG. 5, VT groups 3, 5 and 7 carry VT1.5s while VT Groups 1, 2, 4 and 6 carry VT2s. The cross-hatched columns represent non-VT1.5 traffic which is ignored by the VT1.5 switching elements 22, 62 and 42. All white columns can be interchanged with each other for full time manipulation of the VT1.5 traffic content. VT Groups 1, 2, 4 and 6 can be exchanged if all 4 columns making up each Group are kept together and in the same relative order.

Referring to FIG. 6, VT Groups 3, 5 and 7 carry VT1.5s while VT Groups 1, 2, 4 and 6 contain VT2s. The cross-hatched columns represent non-VT2 traffic which is ignored by the VT2 switching elements 24, 64 and 44. All white columns can be interchanged with each other for full time manipulation of the VT2 traffic content. VT Groups 3, 5 and 7 can be exchanged if all 3 columns making up each VT Group are kept together and in the same relative order.

A similar flow occurs in the space stages. Using the configuration in FIG. 4, the traffic would first enter the VT1.5 space element or stage 62. Here all VT1.5 space switching occurs along with VT Group level switching of VT2 Groups if desired. While it is necessary in the first time stage 20 to get VT Groups in the correct order within the SONET frame, there is no need for VT Group switching in the first stage of the space function 62. Traffic entering the VT2 space switch 64 would then see switching of traffic within the VT Groups composed of VT2s. Traffic leaving the second space stage 64 emerges with all possible space manipulations completed.

Data traffic proceeding into the final time switching function 40 is handled in the same manner as the first time switching function 20 previously described.

The preferred embodiment involves dedication of a certain number of the 7 VT Groups for carrying VT1.5s and the remaining carrying VT2s for all traffic passing through the switch. Once standardized, the switch would be able to establish any connection in a non-blocking environment. Any of the 8 possible VT1.5 and VT2 Group assignment combinations could be used (i.e., 0 VT1.5 Groups and 7 VT2 Groups, 1 VT1.5 Group and 6 VT2 Groups . . . 7 VT1.5 Groups and 0 VT2 Groups). The same switch could be reconfigured to operate with any of these VT Group combinations with the optimal choice depending on the unique traffic requirements presented by a given operating environment.

The positions of the VT1.5 and VT2 Groups within the frame must be standardized only while passing through the space switching elements 62 and 64. The time switches before the space function (i.e., elements 22 and 24) allow any incoming ordering to be justified to the required space switch In Table 1, each row represents 1 of N STS-1 SPE equivalent flows of traffic through the switch elements shown in FIG. 1. Standard Space Switch Mapping can be arbitrarily assigned but then must be held constant for all flows while in space switch 60. In the Table 1 example, all flows maintain a mixture of 4 VT2 Groups and 3 VT1.5 Groups.

The switch arrangement shown in FIG. 4 provides full bandwidth efficiency with the "cost" being the approximate doubling of data delay (most significantly due to the doubling of the time switch stages) and switch element complexity (two stages per function). These "penalties" are more than 15 times less (in terms of data delay and memory size) than that paid using a DS0/E0 switch to provide the same flexibility and 100% bandwidth efficiency.

Space switch 60 is composed of either a single space switch stage, or a cascaded three stage space switch in a CLOS network formation. Space switch 60 performs the crossbar function by moving each column of each input frame to the corresponding column of one output frame or a plurality of output frames in a non-blocking fashion, such that each input column on a given frame is guaranteed to be able to connect to a corresponding free output column on any output frame or a plurality of output frames.

Figure 7:
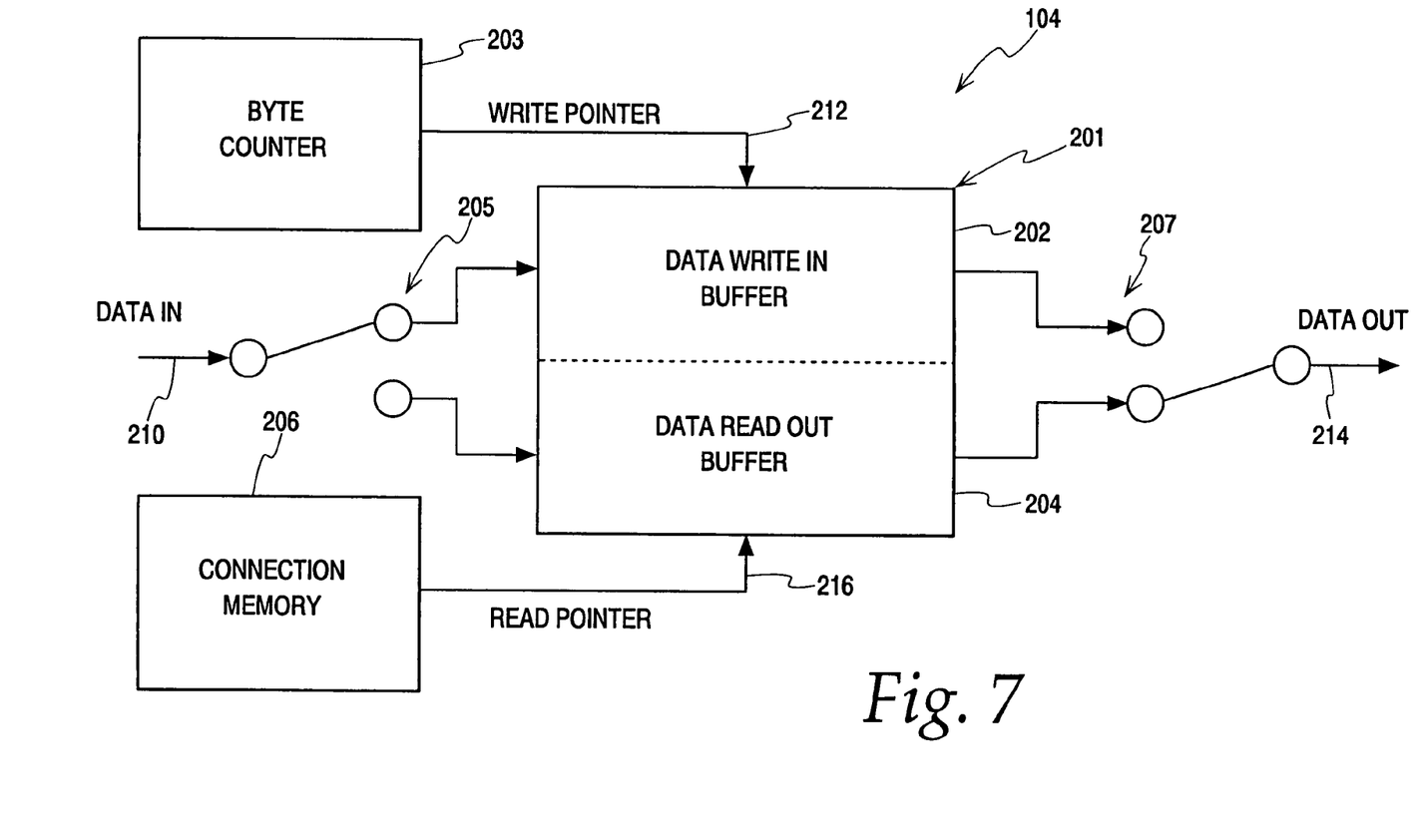
FIG. 7 is a block and functional diagram illustrating a preferred form of time slot interchange for use in connection with the apparatus shown in FIG. 4.

FIG. 7 illustrates an exemplary timeslot interchange function 104 which may be used for any of time switches 22, 24, 42 or 44 (FIG. 4). There are four primary elements involved in timeslot interchange function 104:

(1) A data write in buffer 202 forming half of a memory 201;

(2) A data read out buffer 204 forming another half of memory 201;

(3) A byte counter 203 and (4) A connection memory 206.

At any given time, one half of the data memory 201 is allocated to the data write in buffer 202 and the remaining half is allocated to the data read out buffer 204. The half of memory 201 initially allocated to the data writer in buffer functions as such for x bytes (until the write in buffer memory 201 is completely written). Once memory 201 has been completely written, the data write in buffer 202 becomes the data read out buffer 204 for x bytes, whereby the values stored in the memory 201 can be read out in some predetermined fashion. The function of directing input data to buffer 202 or buffer 204 is represented by a switch 205.

Similarly, the half of the memory initially allocated to the data read out buffer 204 functions as such for x bytes. After the x bytes of stored data have been read out, the data read out buffer becomes the data write in buffer for x bytes. The two halves of the data memory 201 therefore alternate function every x bytes, or one row of a data frame. The half allocated to the data write in buffer stores or accumulates new incoming data, while the half allocated to the data read out buffer reads out the data stored during the previous row's accumulation. The function of reading output data from buffer 202 or buffer 204 is represented by a switch 207. The order of stored bytes being read out of memory 201 is controlled by connection memory 206.

The part of data memory 201 acting as the data write in buffer has the data presented at a data in input 210 written into x successive bytes of memory. So, less than two rows of the data frame, and preferably only one row of the data frame is written into x successive bytes of memory as directed by the write pointer transmitted on bus 212 until all x bytes of the data write in buffer have been written. The write pointer starts at buffer byte 0, and is incremented once every byte time, until reaching its maximum count of buffer bytes (x-1).

At the same time, the part of the data memory 201 acting as the data read out buffer outputs x bytes of stored data in some predetermined sequence to data out output 214 as directed by a read pointer transmitted on a bus 216 which is controlled by connection memory 206. The connection memory directs which of the x buffered bytes will be output at any given data out byte time. Connection memory 206 stores x connection memory addresses, one address for each byte of one row of the data output frame. Each connection memory address stores the number of the data read out buffer byte to be sent at a given data out byte time. For example, if the connection memory address for byte (x-1) is equal to buffer byte 0, this indicates that the data stored in the data read out buffer byte 0 is sent during byte time (x-1) of data out.

Byte counter 203 is used as a circular counter, counting byte times from 0 to (x-1). Upon reaching (x-1), the byte counter returns to 0, and begins counting anew.

The delay encountered in traversing a timeslot interchange function is significant. In general, the timeslot interchange function introduces x bytes of delay, or one row of a data frame, to the alignment of the data frame. In other words, if the first bit of a new frame of data were to enter the timeslot interchange function at time y, the time that the first bit of the new frame of data leaves the timeslot interchange function would be given by:

timeslot interchange exit time=$y$+($x$ bytes*byte time)

Setting y=0 gives the timeslot interchange throughput delay:

timeslot interchange throughput delay=$x$ bytes*byte time

Many telecommunications products carrying voice traffic are required by Telcordia regulation to have less than 125 us throughput delay (based on the period of the Nyquist frequency). Therefore, from a network element perspective, it is advantageous to traverse a timeslot interchange stage with less throughput delay if the particular interchanging requirements will allow for such.

It should be noted that the delays given above denote the delay of a given bit location (possibly the first bit or the framing bit) within the data frame while traversing a timeslot interchange function. This does not account for the change in time-position of a given data byte if that byte is switched to a different location in the data frame via the timeslot interchange function. For example, if a given data byte enters the timeslot interchange at time 0, byte 0, the data might be switched to byte (x-1), leaving the timeslot interchange stage at time z, where:

$z$=throughput delay (given previously)+time-position change $z$=throughput delay+(($x$-1) bytes*byte delay).

Notice that the byte delay is additive to the throughput delay, since the byte is now located (x-1) bytes later in the data frame.

The example could be reversed such that a given data byte enters the timeslot interchange at time 0, byte (x-1), and is to be switched to byte 0, leaving the timeslot interchange stage at time a, where:

$a$=throughput delay (given previously)+time position change $a$=throughput delay+(−($x$-1) bytes*byte delay)

$a$=throughput delay−(($x$-1) bytes*byte delay)

Notice that in this case, the byte delay is subtracted from the throughput delay, since the byte is now located (x-1) bytes earlier in the data frame.

In summary, the timeslot interchange function produces a set throughput delay to the data frame which is always constant, and is equal to the time of one row of the data frame, but that any particular byte traversing a timeslot interchange may be subject to more or less than this delay, based on the time-position of the byte leaving the timeslot interchange stage, relative to the time-position of the byte as it enters the stage.

Figure 8:
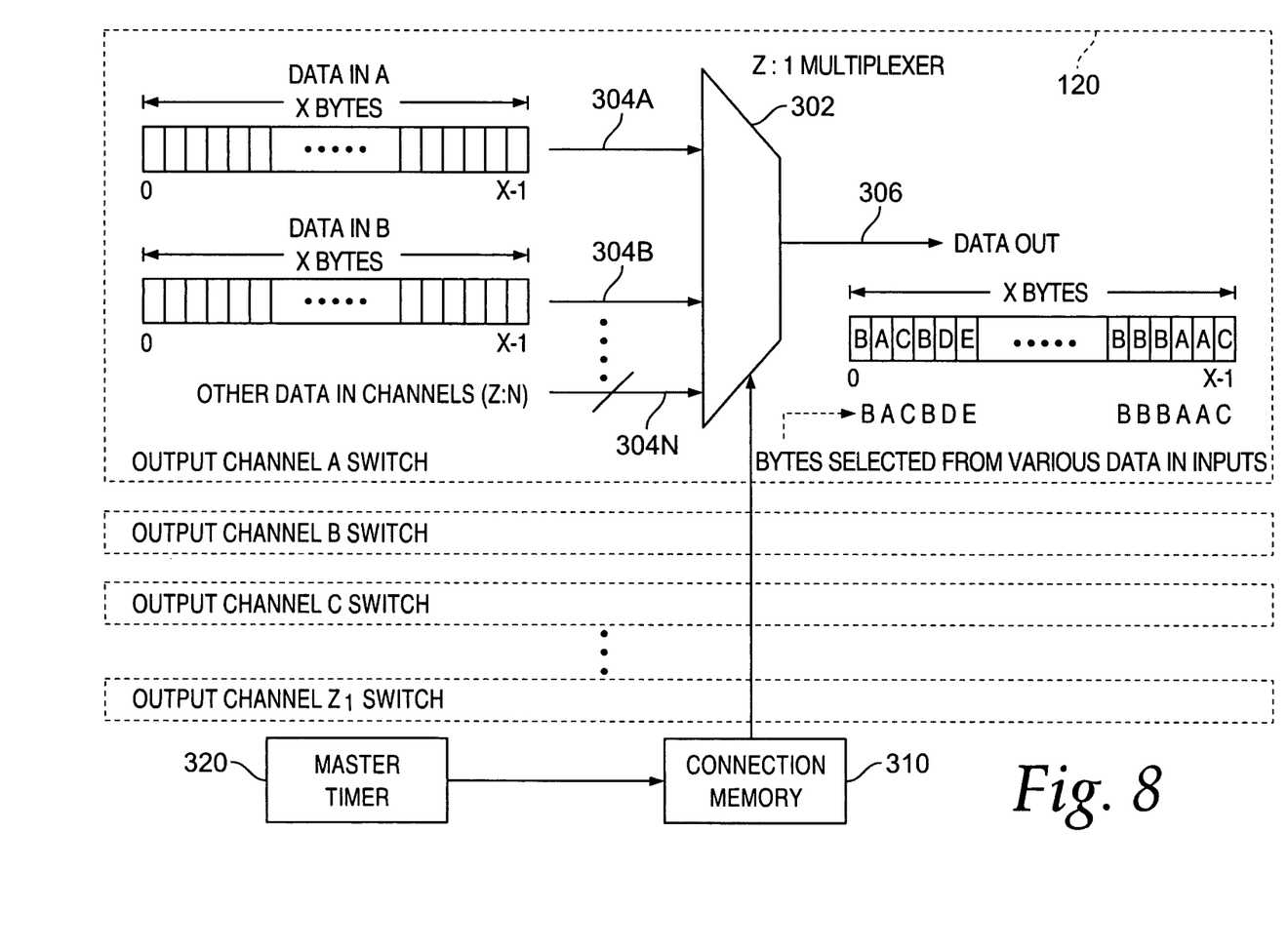
FIG. 8 is a block and functional diagram illustrating a preferred form of the space switch shown in FIG. 4.

An exemplary space switch function 120 suitable for use in either switch 62 or 64 is shown in FIG. 8. There are three primary elements involved in space-switch function 120:

(1) Some number $Z_1$ of Z:1 multiplexers, such as multiplexer 302, which receive data from multiple input channels of channel 30, such as 304 A-304 N;

(2) A connection memory 310; and (3) A master timer 320.

The number $Z_1$ may or may not be equal to Z, depending on the type of space-switch. In the case of a square space-switch with N inputs and outputs (a square multiplexer), $Z_1$=Z. In the case of a space-switch with more outputs than inputs (a space-expanding multiplexer), $Z_1$>Z. In the case of a space-switch with less outputs than inputs (a space-compressing multiplexer), $Z_1$<Z. A given 3-stage space switch may provide additional channels for routability by having a space-expanding multiplexer at its entry node, a square multiplexer at is center node, and a compressing multiplexer at its exit node.

Every Z:1 multiplexer 302 takes in Z inputs, and produces one output on a bus, such as bus 306. The selection of Z inputs is controlled by connection memory 310. Once each byte time, the Z:1 multiplexer is updated by connection memory 310 to select one of the data on inputs 304A-304N to transmit for that byte time. Hitless switching between bytes from different inputs is guaranteed, because the switching always occurs on byte boundaries.

Connection memory 310 stores x connection memory addresses, one address for each byte of one row of the data out output frame. Each connection memory address stores the number of the data input to be sent at a given data out byte time. For example, if the connection memory address for byte (x-1) is equal to data in N, this indicates that the data entering the Z:1 multiplexer 302 during the (x-1) byte time will be sent during byte time (x-1) of data out.

Master timer 320 controls the timing of connection memory 310 such that the connection memory only updates Z:1 multiplexer 302 on byte boundaries.

The delay encountered in traversing a space-switch function is insignificant, mainly due to the fact that no data buffering occurs. In general, the space-switch acts like a large-scale multiplexer with a sizable number of inputs and outputs, and similar to a multiplexer, the space-switch has very little throughput delay associated with it. The delay is so small, in fact, that in comparison to a byte time, it can be considered negligible.

Those skilled in the art will recognize that the preferred embodiments may be altered and modified without departing from the true spirit and scope of the invention as defined in the accompanying claims. For example, the functions illustrated in FIGS. 4-8 may be implemented with a digital signal processor, other type of processor, or application specific integrated circuits capable of logical and arithmetic operation. In addition, the invention can be implemented in SDH technology by substituting VC11s and VC12s in place of the VTs described in this specification. The order of the VT1.5 and VT2 time switches shown in FIG. 4 can be reversed. As pointed out in the Background section, the time space time configuration shown in FIG. 4 can be implemented in various ways. In addition, the FIG. 4 embodiment could be implemented as a space time space arrangement and the like.

What is claimed is:

1. A communication switch comprising a plurality of input channels and a plurality of output channels for switching data comprising a plurality of first groups of data transmitted in a first time order and comprising a plurality of second groups of data transmitted in a second time order, said first groups of data of a different type from said second groups of data, said switch comprising in combination:
   a first switch arranged to alter said first time order of said first groups of data into a third time order;
   a second switch arranged to alter said second time order of said second groups of data into a fourth time order; and
   a third switch arranged to order said first groups of data with respect to said output channels in an output channel order.

2. The switch of claim 1, further comprising a fourth switch arranged to order said second groups of data with respect to said output channels in a second output channel order.

3. The switch of claim 2, further comprising:
   a fifth switch arranged to alter said third time order of said first groups of data into a fifth time order; and
   a sixth switch arranged to alter said fourth time order of said second groups of data into a sixth time order.

4. The switch of claim 1, wherein said third switch further arranged to order said second groups of data with respect to said output channels in said output channel order.

5. The switch of claim 1, wherein said first groups of data comprise virtual tributaries.

6. The switch of claim 1, wherein said second groups of data comprise virtual tributaries.

7. The switch of claim 1, wherein said first groups of data comprise VT1.5s.

8. The switch of claim 1, wherein second groups of data comprise VT2s.

9. The switch of claim 1, wherein said third time order is different from said first time order.

10. The switch of claim 1, wherein said fourth time order is different from said second time order.

11. The switch of claim 1, wherein said third time order is predetermined.

12. The switch of claim 1, wherein said fourth time order is predetermined.

13. A method of switching data received on a plurality of input channels to a plurality of output channels of a switch, said data comprising a plurality of first groups of data transmitted in a first time order and comprising a plurality of second groups of data transmitted in a second time order, said first groups of data of a different type from said second groups of data, said method comprising in combination:
   altering said first time order of said first groups of data into a third time order;
   altering said second time order of said second groups of data into a fourth time order; and
   ordering said first groups of data with respect to said output channels in an output channel order.

14. The method of claim 13, further comprising ordering said second groups of data with respect to said output channels in a second output channel order.

15. The method of claim 14, further comprising:
   altering said third time order of said first groups of data into a fifth time order; and
   altering said fourth time order of said second groups of data into a sixth time order.

16. The method of claim 13, wherein said ordering step further comprises ordering second groups of data with respect to said output channels in said output channel order.

17. The method of claim 13, wherein said ordering step occurs after initiation of said altering said first time order and said altering said second time order steps.

18. The method of claim 13, wherein said first groups of data comprise virtual tributaries.

19. The method of claim 13, wherein second groups of data comprise virtual tributaries.

20. The method of claim 13, wherein said first groups of data comprise VT1.5s.

21. The method of claim 13, wherein second groups of data comprise VT2s.

22. The method of claim 13, wherein said third time order is different from said first time order.

23. The method of claim 13, wherein said fourth time order is different from said second time order.

24. The method of claim 13, wherein said third time order is predetermined.

25. The method of claim 13, wherein said fourth time order is predetermined.

* * * * *